United States Patent [19]
Unekawa

[11] Patent Number: 5,706,425
[45] Date of Patent: Jan. 6, 1998

[54] TIMEOUT PROCESS CIRCUIT AND RECEIVER INCLUDING THIS TIMOUT PROCESS CIRCUIT

[75] Inventor: Yasuo Unekawa, Kanagawa-ken, Japan

[73] Assignee: Kabushiki Kaisha Toshiba, Kawasaki, Japan

[21] Appl. No.: 378,234

[22] Filed: Jan. 26, 1995

[30] Foreign Application Priority Data

Jan. 27, 1994 [JP] Japan .................. 6-007671
Nov. 30, 1994 [JP] Japan .................. 6-297241

[51] Int. Cl.$^6$ .................................................. G06F 13/00
[52] U.S. Cl. .............. 395/185.08; 395/550; 364/267.8; 364/271.9
[58] Field of Search ................ 395/500, 185.08, 395/550; 364/569; 371/62

[56] References Cited

U.S. PATENT DOCUMENTS

| | | | |
|---|---|---|---|
| 3,623,019 | 11/1971 | Groth | 395/550 |
| 5,012,435 | 4/1991 | Bailey et al. | 364/569 |
| 5,471,564 | 11/1995 | Dennis et al. | 395/114 |
| 5,490,153 | 2/1996 | Gregg et al. | 371/32 |
| 5,515,385 | 5/1996 | Fulling et al. | 371/32 |

OTHER PUBLICATIONS

Kurano et al., "Gig-A-Bit ATM Cross–Connect System With STM–ATM Conversion Function", IEEE Communications Society, pp. 1461–1467, (1993).

Guillemin et al., "The Spacer–Controller: Architecture and First Assessments" Broadband Communications, Proc. IFIT TC6 Workshop on Broadband Communications, pp. 313–323, (1992).

Primary Examiner—Kevin J. Teska
Assistant Examiner—Ayni Mohamed
Attorney, Agent, or Firm—Foley & Lardner

[57] ABSTRACT

A timeout process circuit for performing a timeout detection process incorporated in a receiver, having a timer for incrementing time data indicating a current time, a memory including data table to store a reception time of the cell most recently received by the receiver, a register for storing a timeout value indicating a maximum permitted time interval of cell reception, a controller for reading out the reception time stored in the data table the controller receiving the timeout detection start signal from the timer, an adder for adding the reception time from the data table and the timeout value stored in the first register means, a comparator for comparing the result of the addition by the adder with the time data from the timer, and a decision circuit for receiving the comparison result from the comparator and deciding whether or not the cell of the frame in the reassembly is a timeout based on the comparison result. In the timeout process circuit, the reception time of the cell is stored in the data table when the cell is received by the receiver.

18 Claims, 12 Drawing Sheets

TIMEOUT PROCESS CIRCUIT AND RECEIVER INCLUDING THIS TIMOUT PROCESS CIRCUIT

BACKGROUND OF THE INVENTION

1. Field of the Invention

The present invention relates to a receive device or receiver, including a timeout process circuit, for receiving frame data subdivided into a plurality of cells and reassembling these cells into the frame data, and, in particular, to a timeout process circuit and a receive device including this timeout process circuit for efficiently detecting/processing a timeout at a receive station side

2. Description of the Prior Art

Generally, in a network communication, when frame data is subdivided into a plurality of cells and transferred to another communication process device through a network, the interval of reception time of each transferred cell at a receiver side is not same or uniform because of a variety of causes such as discarding of the cell as the result of network congestion, failure or the like, so that a condition is reached over a long period whereby cells belonging to the specific connection are not received.

For example, in the case where the final cell subdivided from a frame is discarded for whatever cause, the last data shown on the frame cannot be received and it is impossible to complete the frame reassembly. In addition, in such a state, a frame memory for storing frame data during reassembly is continuously occupied over an extremely long time period by data which is best discarded. When this type of situation occurs frequently free area in the frame memory is reduced, and this also causes a problem in the normal reassembly of another frame.

Accordingly, when a cell is not received during frame reassembly even after a uniform time has elapsed, a timeout is processed and the frame is discarded during reassembly. The frame memory occupied by this frame data is then released.

In a conventional timeout process circuit as shown in FIG. 1, detection of a timeout is carried out, for example, in the following manner.

FIG. 1 shows a block diagram of a communication process device including a conventional receive device or receiver 122. This conventional receiver 122 includes a timeout process circuit 124. Frame data items presenting character information, picture information, and other information are subdivided into a plurality of cells and transmitted to another communication process device through a network.

In a communication process device of a reception side, each of received cells is transmitted to the receiver 122 in the communication process device through a physical layer controller. The timeout process device 124 incorporated in the receiver 122 executes specified processes for the received cells, for example, detection of a timeout and performs a timeout process, and the receive device 122 reassembles a frame by using the received cells. Then, the frame data is transmitted to a CPU in the communication process device through a system bus.

We will explain the processes executed by the receive device 122 for the received cells in detail.

FIG. 2 is a configuration diagram of the receiver 122 in the communication process device shown in FIG. 1.

First, a maximum permitted time value (hereinafter called as "a frame reassembly timer value") of the cell reception time interval is set in a register 110. Each connection table 108 has a timeout information field 109 for storing data relating to an elapsed time counted from a time of receiving of a last cell up to the present time.

Then, when the timer value in a timer 101 is incremented, a timeout detection start signal 111 is transmitted from the timer 101 to a timeout detection control circuit 107, and the time data in the timeout information field 109 in the connection table 108 is successively read out by the timeout detection control circuit 107.

The readout time data is stored firstly in a register 103 and is incremented in an adder 104 by the addition of a fixed value "1" which has been set in a register 102. The incremented time data is subtracted from a frame reassembly timer value stored in a register 110 by a subtractor 105 in order to compare them, the time data and the frame reassembly timer value.

As a result of the subtraction operation, when the time data is greater than the frame reassembly timer value, a timeout is occurred in this frame reassembly operation judged by a decision circuit 106, and a timeout detection signal is transmitted from the decision circuit 106 to the timeout detection control circuit 107.

On the other hand, when the time data is smaller than the frame reassembly timer value, it is known by the decision circuit 106 that a timeout is not happened, and the incremented time data which is transmitted from the adder 104 is written into the timeout information field 109 in the connection table 108.

Following this, when a timeout is detected by the decision circuit 106, it must be required to execute processes (1) to (3) after the detection of the timeout:

(1) loading the connection table 108 relating to a connection which is detected as the timeout;

(2) resetting the connection table 108; and (3) releasing a field in the frame memory 128 for an error frame detected as the timeout (in other words, called as "connecting an idle que"), or storing a frame information table relating to an error frame when the error frame is transmitted to upper layer, for example, from the receive device to the CPU as shown in FIG. 1.

These processes (1) to (3) are executed as requests of interrupt processes which are asynchronous with a reception process of cells.

Since the cell transmission speed is comparatively low in this type of conventional timeout process circuit 124, the conventional timeout process circuit 124 receives a timeout process request after the cell reception process has been carried out, and the timeout process can be executed and continued to completion. However, when a cell transmission rate is converted to high speed (for example, 156 Mbit/sec), it is impossible for the timeout process to be executed and continued to completion during the cell reception process. This is a problem for the conventional timeout process circuit.

In order to overcome the conventional problem described above, it is possible to consider dividing the timeout process into several part processes and these part processes are performed during the cell reception process.

However, with this type of technique, arbitration of the cell reception process and a timeout process request generated asynchronously for the cell reception process is a problem.

Moreover, it is required to perform two processes (a read-out process for reading time data and a write-in process for writing updated time data) in a read/write to connection table. In this case, the access operation efficiency of access to the connection table becomes low.

In addition, because the timeout detection process is initiated when the timer value in the timer 101 is incremented, a next timeout detection process is initiated before the completion of the timeout detection processes for all connections when there are many connections reassembling frames. In this case, a timeout detection start signal for the following timeout detection process from the timer 101 is not received at the timeout detection control circuit 107. Even if the current timeout detection process is completed, there is no timeout detection process before a second new timeout detection process following the next timeout detection process is initiated. Therefore, an occurrence of a timeout for current connection cannot be detected at an early stage and unnecessary frame data is stored in the frame memory 128 and efficient use of the frame memory 128 is prevented.

As can be understood from the foregoing explanation, in a conventional timeout process circuit incorporated in a receiver in a communication process device, effective arbitration control of the cell reception process and the timeout process request is not established when the subdivided timeout processes are performed in a cell reception process.

In addition, time data about a reception cell must be read out during a timeout detection process and written into the connection table 108 during the timeout detection process and or immediately following a completion of a timeout detection process, therefore access is inefficient.

An occurrence of a timeout cannot be detected at an early stage so efficient use of the frame memory is not possible.

SUMMARY OF THE INVENTION

Accordingly, a first object of the present invention is, with due consideration to the drawbacks of such conventional communication process device, to provide a timeout process circuit capable of efficiently accessing connection table in a control memory in order to increase an operational efficiency of a receiver incorporating the timeout process circuit.

A second object of the present invention is to provide a timeout process circuit capable of effectively controlling arbitration of a cell reception process and a timeout process request, and capable of efficiently detecting and processing timeouts which can be processed concurrently with cell reception.

A third object of the present invention is to provide a timeout process circuit which can detect the occurrence of a timeout at an early stage and which can efficiently use a frame memory.

A preferred embodiment of the present invention is a timeout process circuit for performing a timeout detection process incorporated in a receiver for reassembly of a frame which being subdivided into a plurality of cells for data communication, the timeout process circuit comprising:

timer means for incrementing time data indicating current time and transmitting the time data and a timeout detection start signal;

memory means comprising data table for storing a reception time of the cell most recently received by the receiver;

first register means for storing a timeout value indicating a maximum permitted time interval of the cell reception;

control means for reading out the reception time stored in the data table in the memory means of the control means receiving the timeout detection start signal from the timer means;

adder means for adding the reception time read out from the data table and the timeout value stored in the first register means;

comparator means for comparing the result of the addition performed by the adder means with the time data from the timer means; and decision means for receiving the comparison result from the comparator means and deciding whether or not the cell of the frame in the reassembly is a timeout based on the comparison result.

Another preferred embodiment of the present invention is a timeout process circuit for detecting a timeout detection process incorporated in a receiver for reassembly of a frame has been subdivided into a plurality of cells for data communication, the timeout process circuit comprising:

timer means for incrementing time data indicating current time and transmitting the time data and a timeout detection start signal;

first register means for storing a timeout value indicating a maximum permitted time interval of cell reception of each of the plurality of cells;

adder means for adding the time data from the timer means and the timeout value from the first register means and transmitting the result of the addition as a timeout time;

memory means comprising a data table for storing the timeout time relating to the cell most recently received by the receiver;

control means for reading out the timeout time of the cell stored in the data table in the memory means of the control means receiving the timeout detection start signal from the timer means;

comparator means for comparing the timeout time of the cell read out by the control means and the current time from the timer means; and decision means for receiving the comparison result from the comparator means and deciding whether or not the cell of the frame in the reassembly is a timeout based on the comparison result, wherein the timeout time of the cell is stored in the data table when the cell is received by the receiver.

The timeout process circuit described above may further comprise:

state means for receiving and storing the number of timeout detection start signals transmitted from the timer means, and for transmitting the timeout detection start signal to the control means if there is at least one timeout detection start signal in the state means, wherein when receiving the timeout detection start signal transmitted from the state means, the control means initiates the timeout detection operation, and the control means transmits a timeout detection completion signal to the state means when the timeout detection operation is completed, and the control means executes continuously the timeout detection process when the control means receives a subsequent timeout detection start signal from the state means and/he control means transmits the timeout detection completion signal to the state mens.

The receiver comprising the timeout process circuit described above may further comprise:

first flag means for storing a process status flag which indicates a state of execution of the timeout process, said timeout process which being subdivided into several subprocesses which are executed separately in time sharing, wherein the control means executes each of the subprocesses separately in time based on the content of the process status flag during the cell reception process.

The receiver described above may further comprise:

second flag means for storing a connection reception status flag indicating an occurrence of a cell reception of a connection which is the same as the connection in the timeout processing operation, wherein when cell reception in the connection of the timeout processing operation occurs, the process status flag is reset so that the timeout process is aborted and the cell reception process is executed prior to this timeout process based on a content of the same connection status flag.

The receiver comprising the timeout process circuit described above may further comprise third flag means for storing a progress status flag for indicating a progress state of the timeout detection process, wherein when cell reception in the connection of the timeout processing operation occurs, the timeout process is executed prior to the cell reception process based on a content of the progress status flag.

In the timeout process circuit described above, the reception time of the cell may be stored in the data table when the cell is received by the receiver.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

Other features of this invention will become apparent in the course of the following description of exemplary embodiments which are given for illustration of the invention and are not intended to be limiting thereof.

Embodiments of the present invention will now be explained with reference to the drawings.

Figure 3:
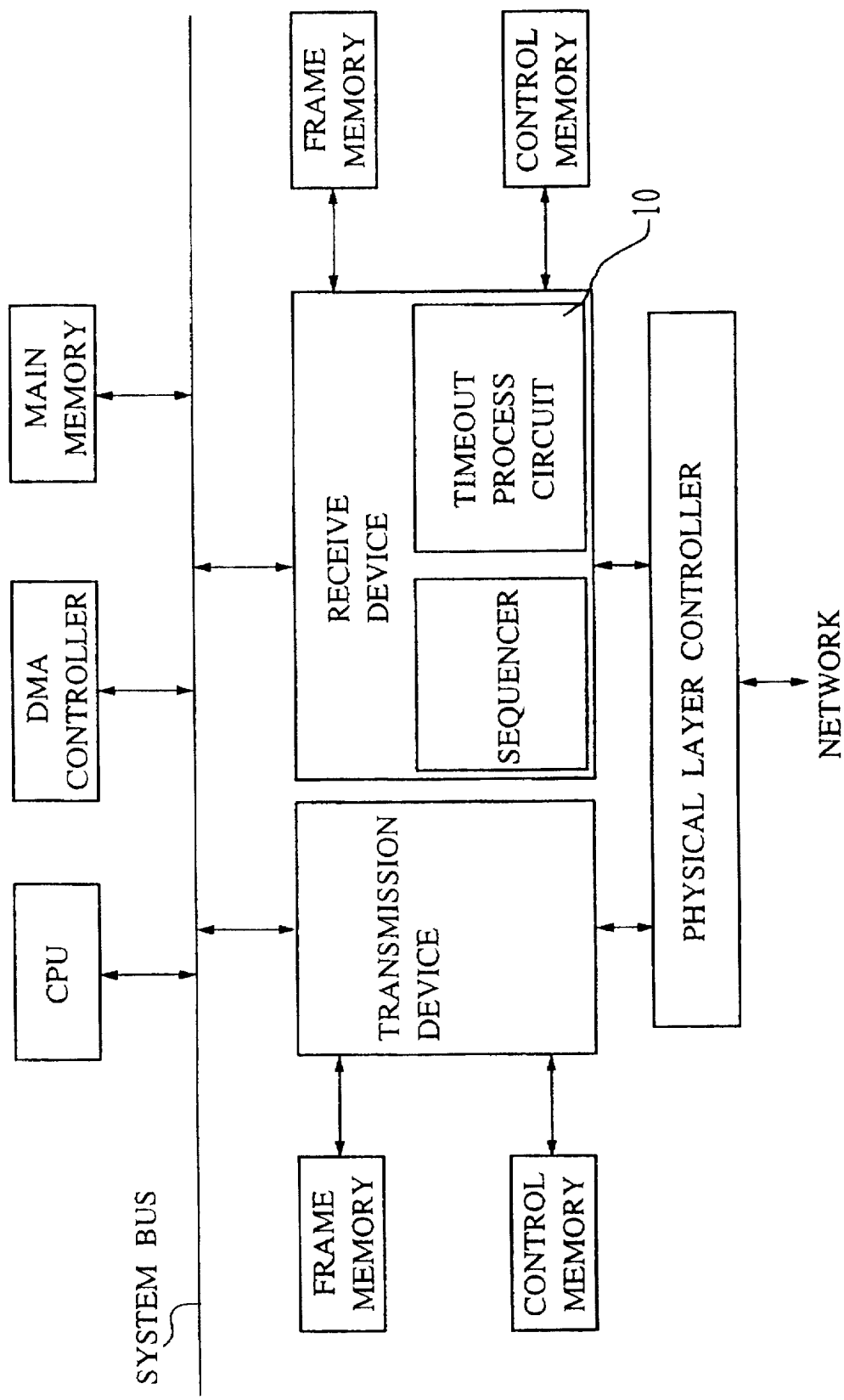
FIG. 3 is a configuration diagram of a communication process device of the present invention.

FIG. 3 is a block diagram showing a communication process circuit including a receiver including a timeout process circuit 10 for a first embodiment of the present invention.

In general, in data communication for character data (or character information), picture data, and the other kinds of data, frame data representing these data items are subdivided into a plurality of cells and transferred to other communication process devices through a network.

At a communication process device of a reception side, each of received cells is transmitted to a receiver through a physical layer controller. The reception device executes desired processes for the received cell and then transmits the reassembled frame to a CPU through a system bus.

Hereinafter, we will describe the desired processes for the received cells at the receiver including a timeout process circuit 10 according to a first embodiment of the present invention in detail.

Figure 4:
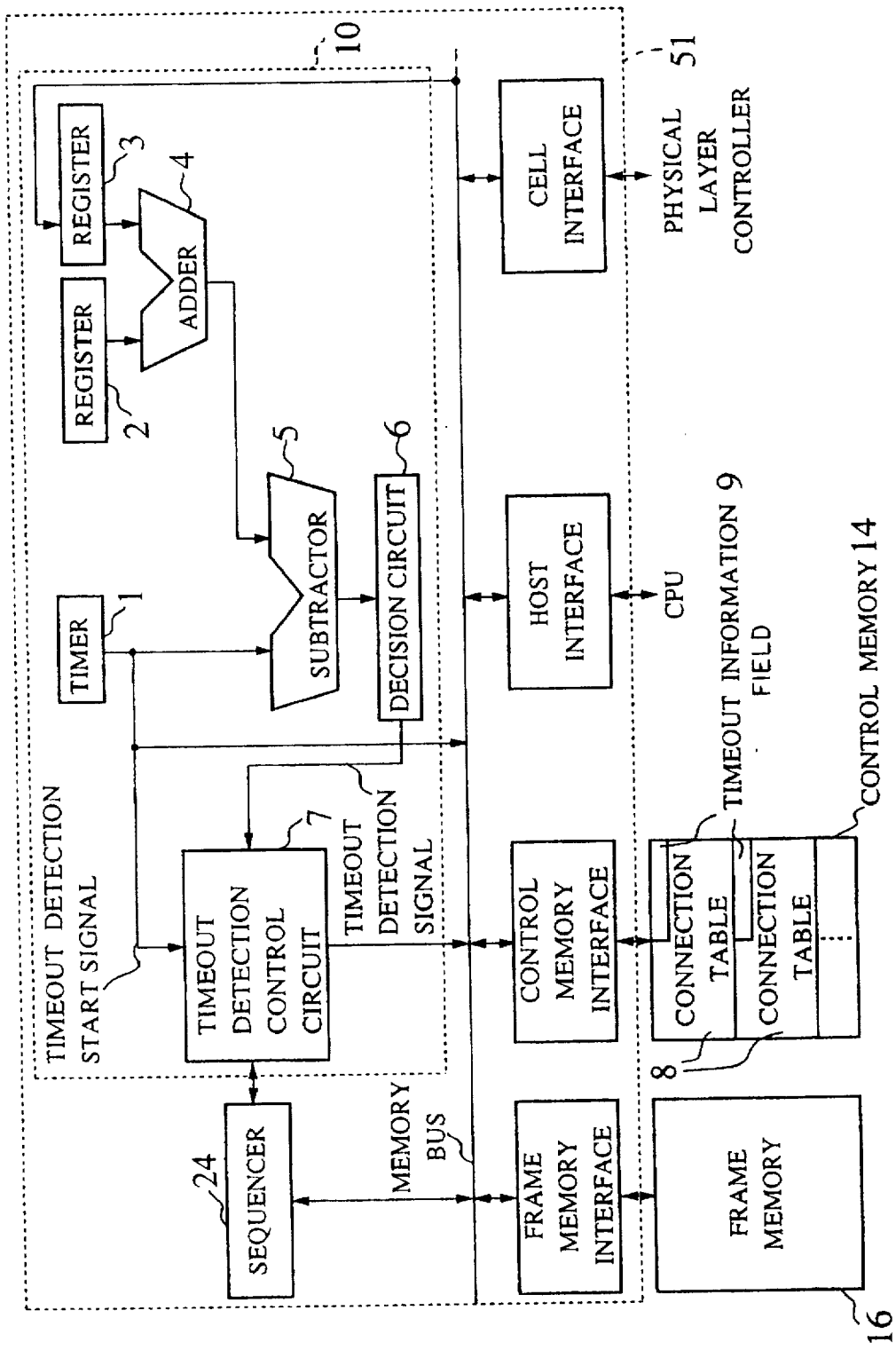
FIG. 4 is a configuration diagram of a receiver including a timeout process circuit as a first embodiment of the present invention.

FIG. 4 is a block diagram mainly showing a configuration of the timeout process circuit 10 incorporated in a receiver 51 as a first embodiment of the present invention.

In FIG. 4, the timeout process circuit 10 receives a plurality of cells transmitted from other communication process device (not shown). The plurality of the received cells form an item of frame data in order to reassemble the frame thorough the physical layer controller.

As shown in FIG. 4, the timeout process circuit 10 comprises a timer 1, a register 2, a timeout detection control circuit 7, a register 3, an adder 4, a subtractor 5, and decision circuit 6.

The timer 1 indicates current time when the reception device or the receiver 51 receives segmented frame data, and when the value "0" is written in during reset and the reset is released, a timer value in the timer 1 is incremented at a desired time interval, then, when the timer value is incremented the timer 1 generates a timeout detection start signal.

A timeout value for a frame for delaying an incoming cell is set in the register 2.

The timeout detection control circuit 7 reads out a reception time stored in the timeout information field 9 in the connection table 8.

The register 3 stores the reception time which is read out from the connection table 8 by the timeout detection control circuit 7.

The adder 4 adds the reception time read out from the connection table 8 by the timeout detection control circuit 7 to a timeout value set in the register 2.

The subtractor 5 compares the result of the addition by the adder 4 and a timer value as a current time in the timer 1 by subtracting them.

The decision circuit 6 decides whether a timeout has occurred for the frame which is being reassembled based on a comparison of the subtraction results of the subtractor 5.

The receiver 51 comprises a sequencer 24 which controls entire operations of the receiver 51 in addition to the timeout process circuit 10.

A control memory 14 and a frame memory 16 are placed at external sections of the receiver 51 in the communication process device. The time data and other data of a reception cell are transferred between the receiver 51 and the control memory 14.

There is a timeout information field 9 in each of the connection table 8. The most recent reception time (or incoming time data) for a cell of a frame which is reassembled currently is stored as a time data in the timeout information field 9. In addition, each segmented frame data item is stored with a pointer in the frame memory 16.

In this configuration of the receiver 51 of the first embodiment described above, the incrementation of the timer value of the timer 1 results in a timeout detection start signal being provided to the timeout detection control circuit 7 so that the timeout detection operation is commenced. Specifically, a time data stored in the timeout information field 9 in the connection table 8, in which data related to the frame during reassembly is stored, is read out successively by the timeout detection control circuit 7.

After the time data from the timeout information field 9 is set in the register 3, the time data is added by the adder 4 to a maximum permitted time value (or timeout value) for a reception time interval of a reception cell which has already been set in the register 2. The result of this addition is subtracted from the timer value in the register 1 by the subtractor 5.

In the case where the result of the subtraction by the subtractor 5 is negative, the decision circuit 6 decides this connection is a timeout and generates a timeout detection signal and transmits it to the timeout detection control circuit 7. Then, the timeout detection process for this connection is completed.

Simultaneously, a timeout process request signal is transmitted from the timeout control circuit 7 to the sequencer 24. When the timeout process request signal is received at the sequencer 24, the timeout detection process is then stopped, and the timeout process is completed, the sequencer 24 generates a timeout detection re-start signal and transmits this signal to the timeout detection control circuit 7 in order to restart the time data readout operation from the control memory 14 for each frame.

On the other hand, in the case where the result of the subtraction is positive or zero, the decision circuit 6 decides no timeout and the readout of time data from the connection table 8 continues.

In this manner, when all the time data from the connection table 8 has been read out, the timeout detection operation is completed, and the timeout detection control circuit 7 waits for the timeout detection start signal for the next timeout detection generated by the timer 1.

As can be clearly understood from the above explanation, in the timeout process circuit 10 of the first embodiment, access to the connection table 8 for timeout detection only requires a read out. Specifically, in the timeout process circuit 10 of the first embodiment of the present invention, a write-in process of time data to the timeout information field 9 in the connection table 8 is performed during the reception process of incoming cells at the receiver 51 through the physical layer controller, not during the timeout detection process. This important feature of the timeout process circuit of the first embodiment can be achieved by the configuration of the timeout process circuit, as shown in FIG. 4.

Figure 1:
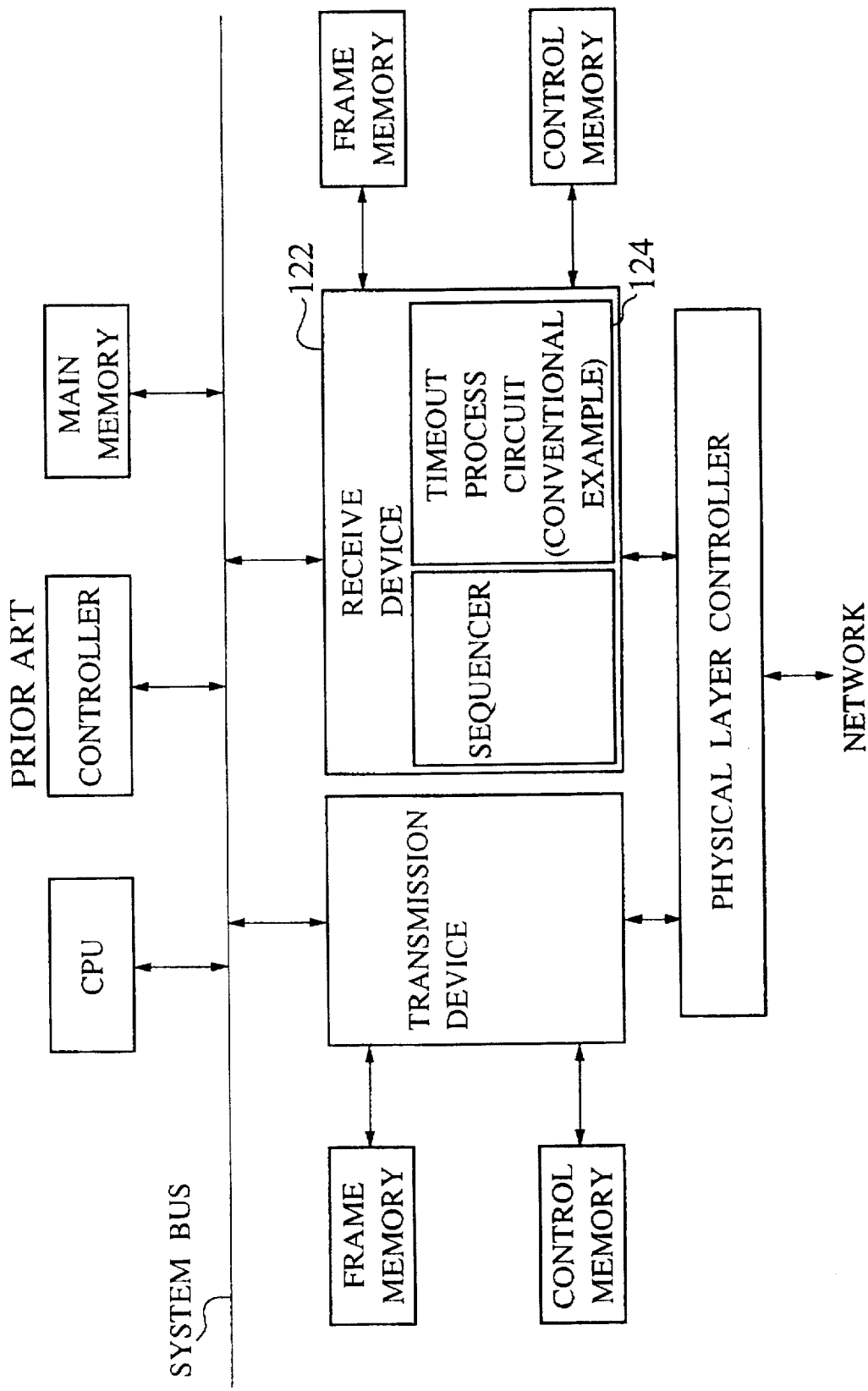
FIG. 1 is a configuration diagram showing a conventional communication process device.
Figure 2:
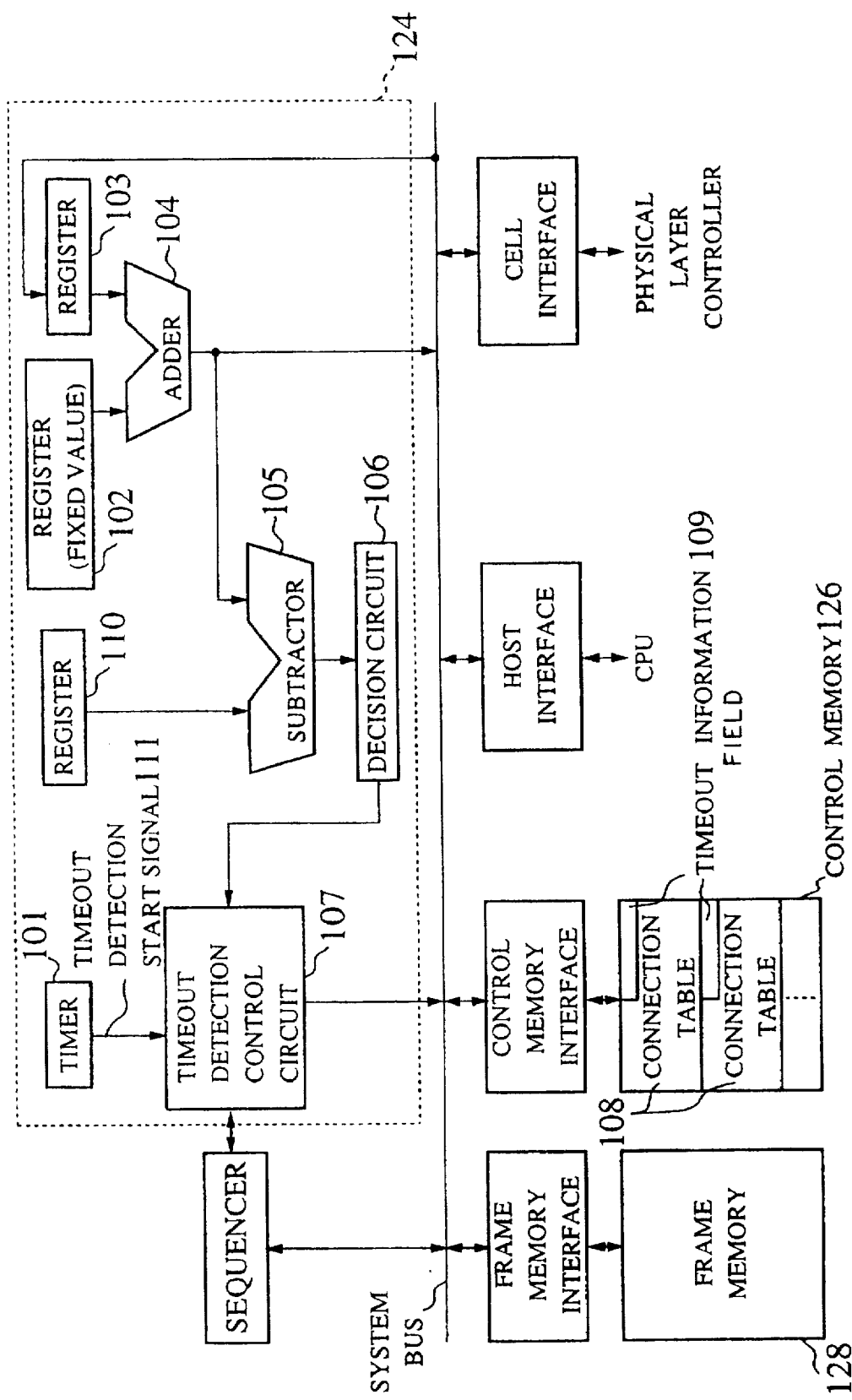
FIG. 2 is a configuration diagram showing a conventional receiver including a conventional timeout process circuit.

As opposed to the features of the timeout process circuit of the first embodiment of the present invention described above, it is required to perform the write-in operation for an incremented timer value from the timer 1 to the timeout information field 9 in the connection table 8 and the readout process for the time data stored in the timeout information field 9 in the conventional timeout process circuit shown in FIG. 2. Therefore, the timeout process circuit 10 of the first embodiment of the present invention can achieve effective access to the connection table 8 because only the readout process from the timeout information field 9 is required during the timeout detection process, and the present invention can increase the timeout detection process speed.

In addition, normally an external memory located at an outside section of the receiver 51 is used for the control memory 14 in order to store connection tables for many connections when there are many connections. Accordingly, a reduction of access to the connection table 8 makes it possible to reduce the memory bus traffic, to reduce the power consumption for I/O interfaces, and to reduce the wait cycle associated with memory access.

Figure 5:
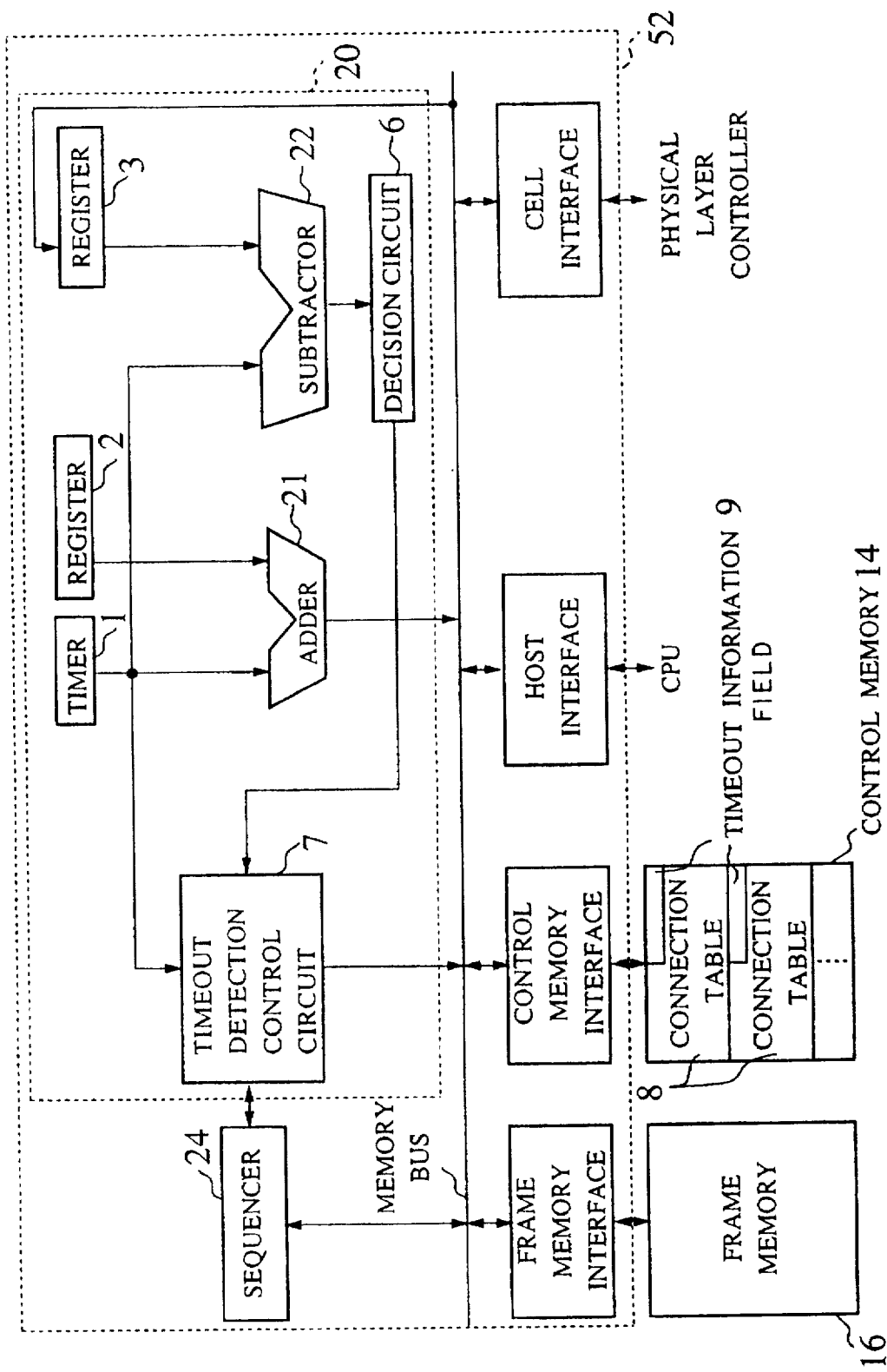
FIG. 5 is a configuration diagram of a receiver including a timeout process circuit as a second embodiment of the present invention.

FIG. 5 is a configuration diagram showing a timeout process circuit 20 of a second embodiment of the present invention.

The features of the second embodiment in configuration and function, as shown in FIG. 5, are as follows.

The timeout process circuit 20 comprises an adder 21 for adding the timer value of the timer 1 to the timeout value for a frame reassembly set in the register 2, and a subtractor 22 for subtracting the timer value of the timer 1 from the time data set in the register 3. Also, a timeout time for a frame during reassembly process which is transmitted as the result of adding the timeout value by the adder 21 is written into the timeout information field 9 in the connection table 8 in the control memory 14. The write-in process for this timeout time to the timeout information field 9 is performed when a new incoming cell is received by the receiver 52 through the physical layer controller.

In general, there is almost no reduction in the processing speed of a timeout process circuit or there is no overhead of write-in operation to the connection table 8 the result of the addition operation between the timer value in the timer 1 and the timeout value in the register 2 performed by the adder 21, because the renewal of the connection table 8 is performed after the completion Of the cell reception operation during a cell reception.

In the timeout process circuit 20 of the second embodiment shown in FIG. 5, since the time data read out and transmitted from the timeout information field 9 designates the time of the timeout for a frame reassembly of the current connection, the decision whether the timeout has occurred for the current connection can be performed only by subtracting the timeout time in the timeout information field 9 from the timer value of the timer 1.

It is not required to perform the addition operation between the time data stored in the timeout information field 9 and the maximum permitted time value (timeout value) stored in the register 2 by the adder 4 in the timeout process circuit 10 of the first embodiment shown in FIG. 4. Therefore, a much higher speed of the timeout detection operation of the timeout process circuit 20 of the second embodiment can be achieved.

Figure 6:
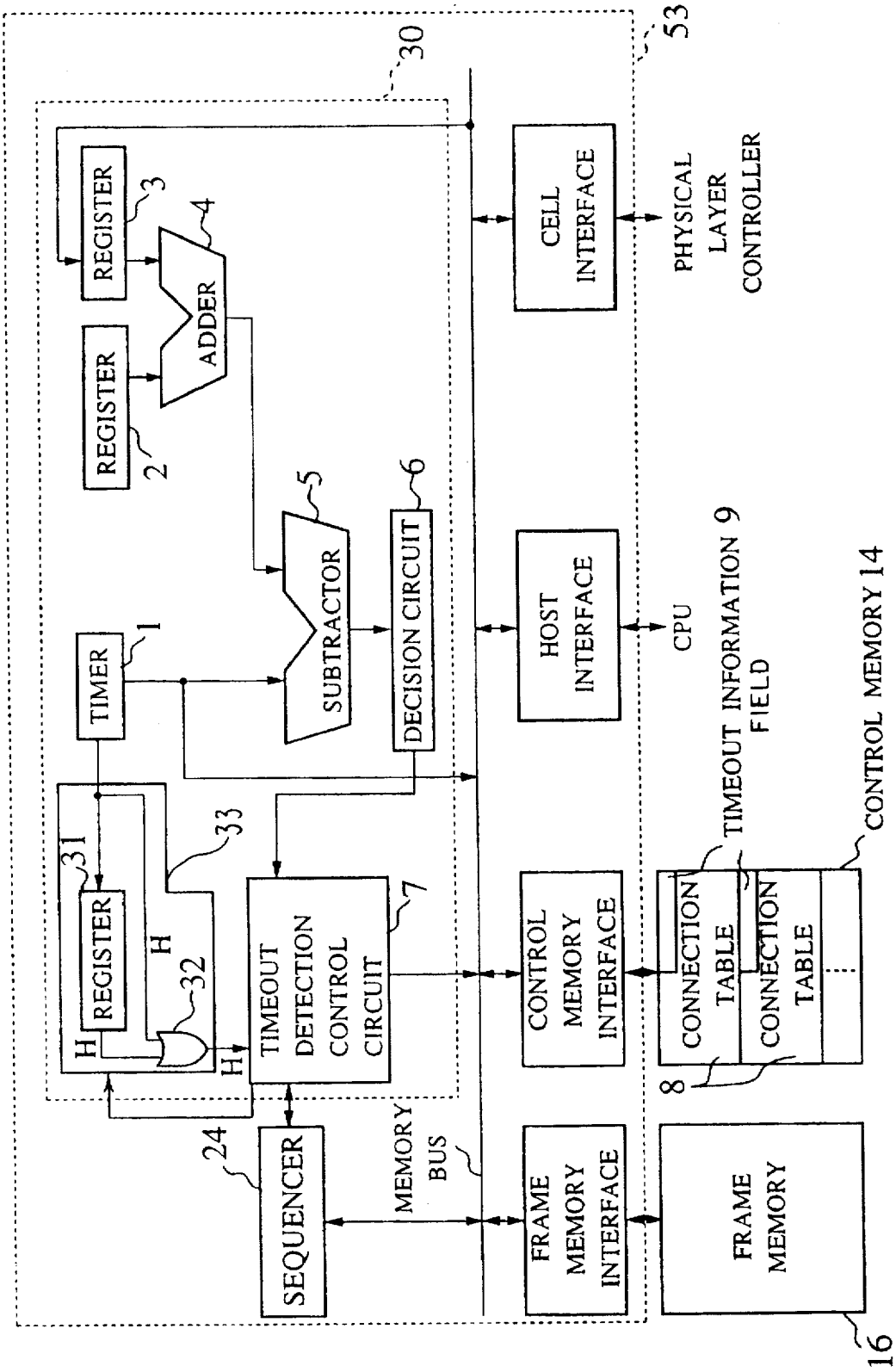
FIG. 6 is a configuration diagram of a receiver including a timeout process circuit as a third embodiment of the present invention.

FIG. 6 is a configuration diagram of a timeout process circuit 30 of a third embodiment of the present invention. The features relating to the configuration of the timeout process circuit 30 of the third embodiment are as follows.

The timeout process circuit 30 comprises a state machine 33 or state means including a register 31 and a OR circuit 32. The register 31 stores one or more of timeout detection start signals transmitted from the timer 1. The OR circuit 32 performs an OR arithmetic operation of two timeout detection start signals transmitted from the register 31 and the timer 1. The state machine 33 is located between the timer 1 and the timeout detection control circuit 7.

Specifically, in the timeout process circuit 10 of the first embodiment shown in FIG. 4, the timeout detection process is commenced only by incrementing the timer value in the timer 1 and a following timeout detection start signal generated before the completion of the current timeout detection operation caused by the previous timeout detection start signal is neglected.

The state machine 33 receives and stores the number of the timeout detection start signals transmitted from the timer 1 and transmits the timeout detection start signal to the timeout detection control circuit 7 as long as there is the timeout detection start signal of at least one in the state machine 33.

When receiving the timeout detection start signal transmitted from the state machine 33, the timeout detection control circuit 7 initiates the timeout detection operation and transmits a timeout detection completion signal to the state machine 33 when the timeout detection operation is completed.

The timeout detection control circuit 7 executes continuously the timeout detection process when the timeout detection control circuit 7 receives a following timeout detection start signal from the state machine 33 and the timeout detection control circuit 7 transmits the timeout detection completion signal to the state machine.

As opposed to this operation of the timeout process circuit 10 of the first embodiment shown in FIG. 4, in the timeout process circuit 30 of the third embodiment shown in FIG. 6, even if a subsequent timeout detection start signal is generated by incrementing the timer value in the timer 1 during execution of the current timeout detection operation, the data of the new timeout detection start signal is stored in the state machine 33 so that the timeout detection operation can be continuously performed after the completion of the current timeout detection operation.

Figure 7:
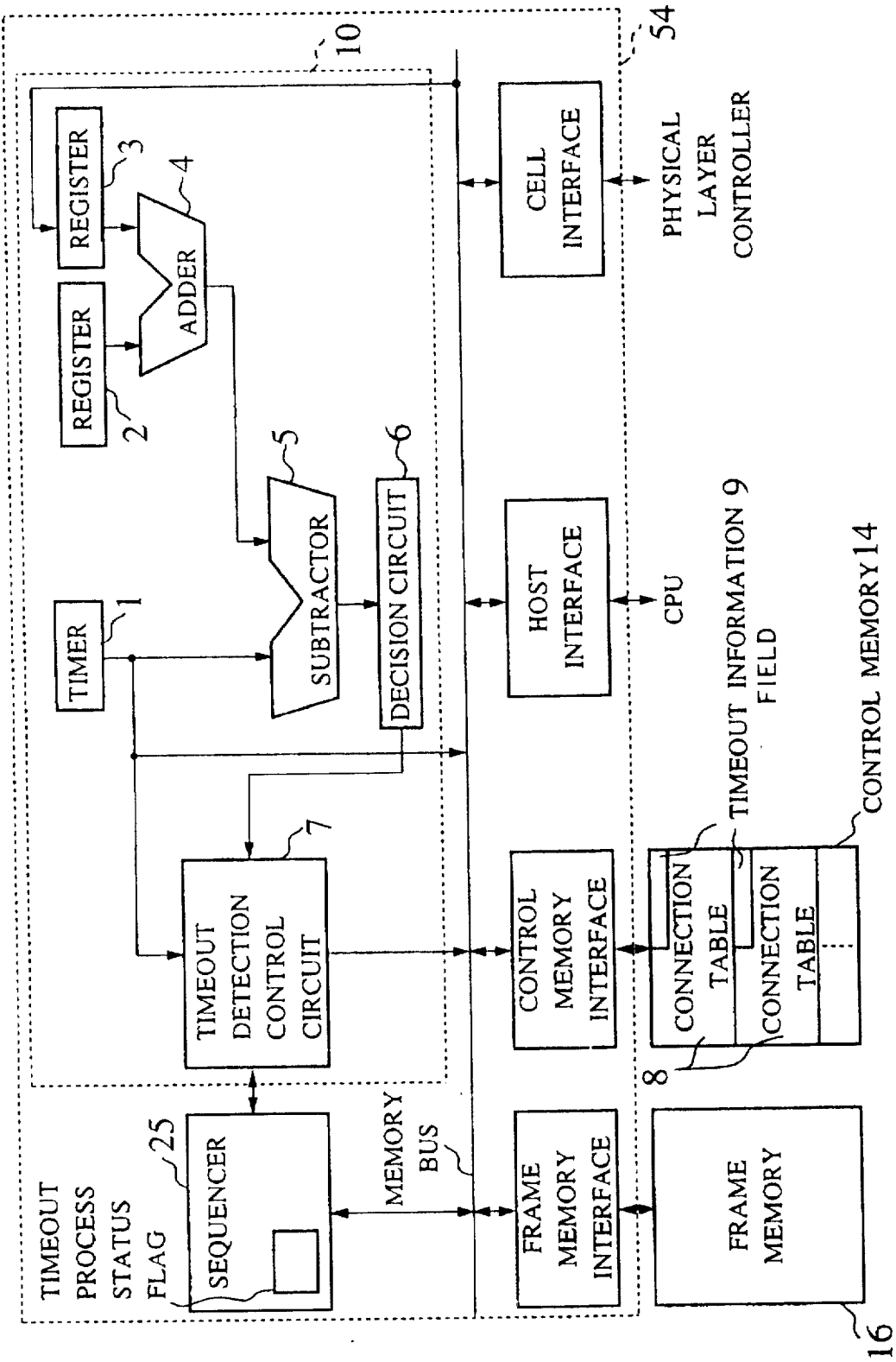
FIG. 7 is a configuration diagram of a receiver of a fourth embodiment of the present invention.

FIG. 7 is a configuration diagram of a receiver 54 of a fourth embodiment of the present invention.

The receiver 54 comprises the timeout process circuit 10 of the first embodiment shown in FIG. 4 and a sequencer 25. The sequencer 25 has a special feature in configuration and function.

Figure 8:
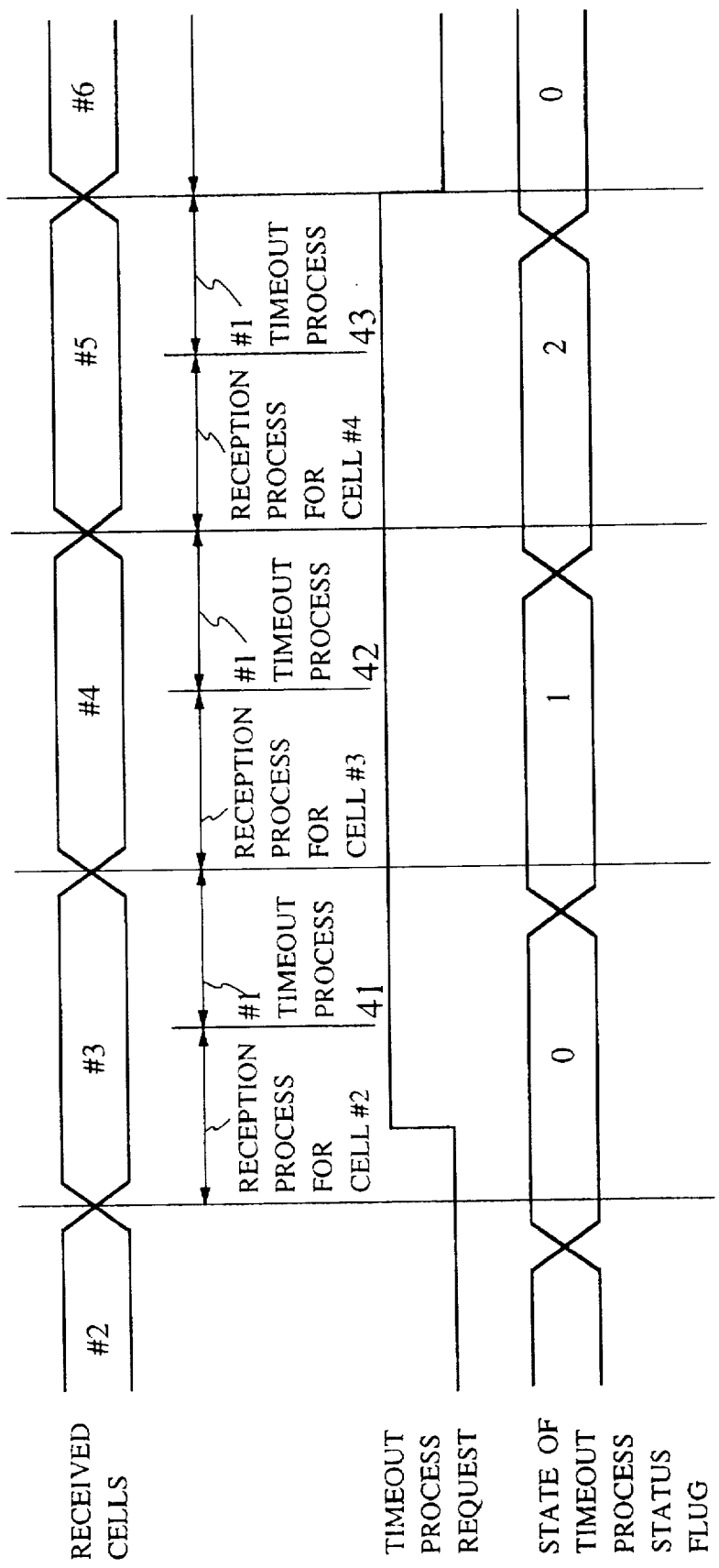
FIG. 8 is a timing chart of operation of the receiver shown in FIG. 7.

FIG. 8 is a timing chart showing an operation of the timeout process circuit in the receiver 54 of the fourth embodiment.

As features of the receiver 54 of the fourth embodiment, as shown in FIGS. 7 and 8, the timeout operation status flag (hereinafter called the "process status flag") for indicating a progress state of a subdivided timeout process after detection of a timeout detected by the decision circuit 6 is provided in the sequencer 25. Thereby, the subdivided processes after the detection of the timeout are executed during a cell reception operation based on the content of the process status flag.

Specifically, in the timing chart shown in FIG. 8, the process (timeout process) following to the timeout detection is divided into three processes comprising a load process 41 for loading the connection table 8 for a frame during reassembly which has been subjected to the timeout, a reset process 42 for the connection table 8, and a release process for the frame memory 16 or a store process 43 for storing the timeout frame information. By updating of the content of the process status flag as the process proceeds (from 0 to 1 to 2 to 0 shown in FIG. 8), it is possible to execute the separent processes of the timeout process in interval of the cell reception processes.

The process status flag is reset after the completion of the timeout process. Accordingly, for example, even if there is a process to be executed during a cell reception process other than the timeout process request such as a DMA transfer process of a reassembled frame which has been completed or a command process from a host CPU, it can be easily controlled to perform a progress of the subdivided timeout processes based on the content of the process status flag.

In this manner, since a timeout process is subdivided into a plurality of small processes and each of the subdivided timeout processes is executed based on the content of the process status flag, even in the case where a timeout process extends over a plurality of cell reception processes, it is possible to execute the cell reception processes and the subdivided timeout processes alternately.

Accordingly, effective arbitration control of the cell reception process and the timeout process request is possible, and it is possible to efficiently carry out a timeout detection process and a timeout process in parallel with cell reception processes.

Figure 9:
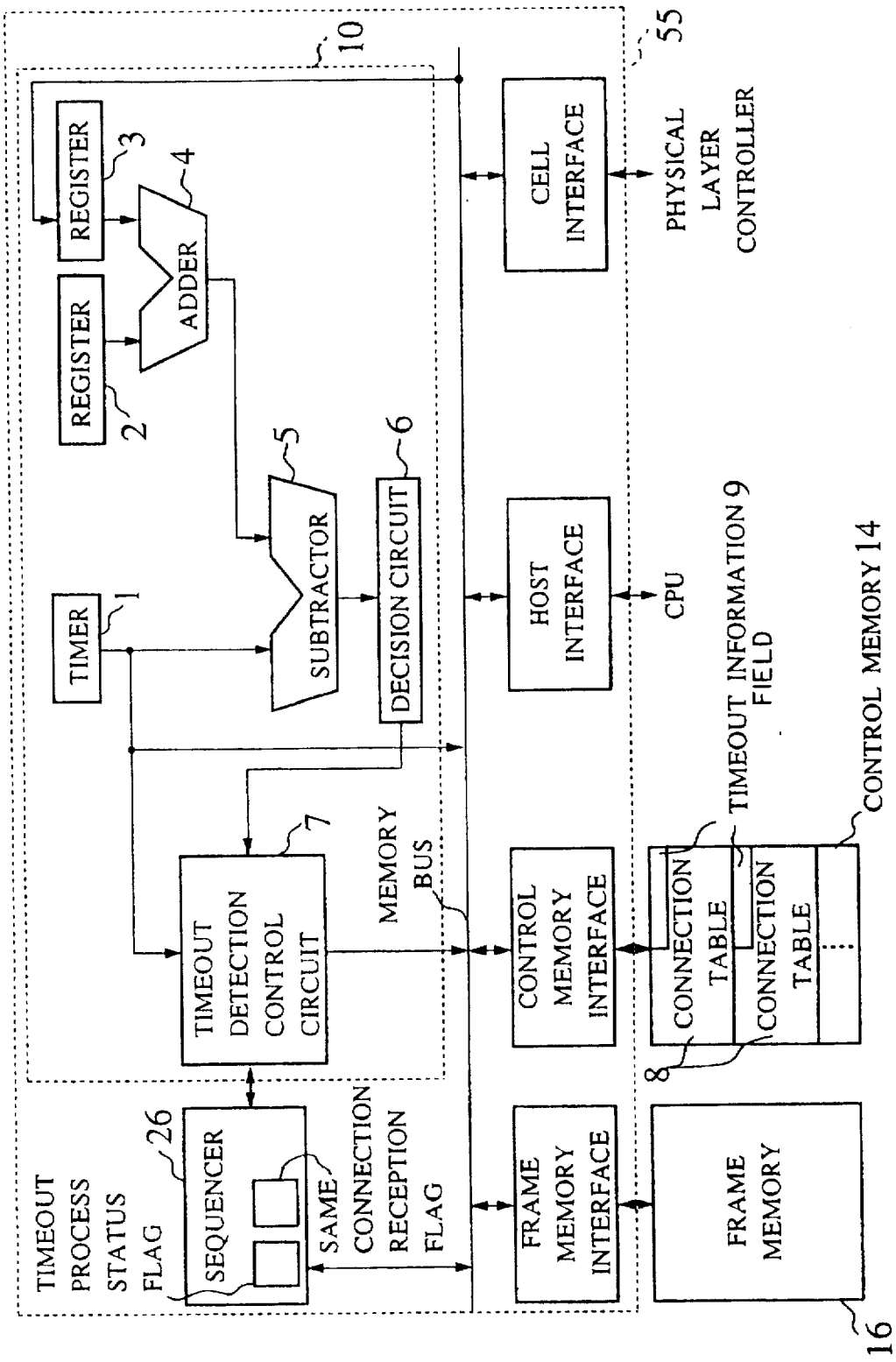
FIG. 9 is a configuration diagram of a receiver of a fifth embodiment of the present invention.

FIG. 9 is a configuration diagram of a receiver 55 of a fifth embodiment of the present invention.

The receiver 55 of the fifth embodiment comprises the timeout process circuit 10 of the first embodiment shown in FIG. 4.

The receiver 55 of the fifth embodiment has a feature of a sequencer 26 in addition to the feature of the sequencer 25 of the fourth embodiment shown in FIG. 7.

Figure 10:
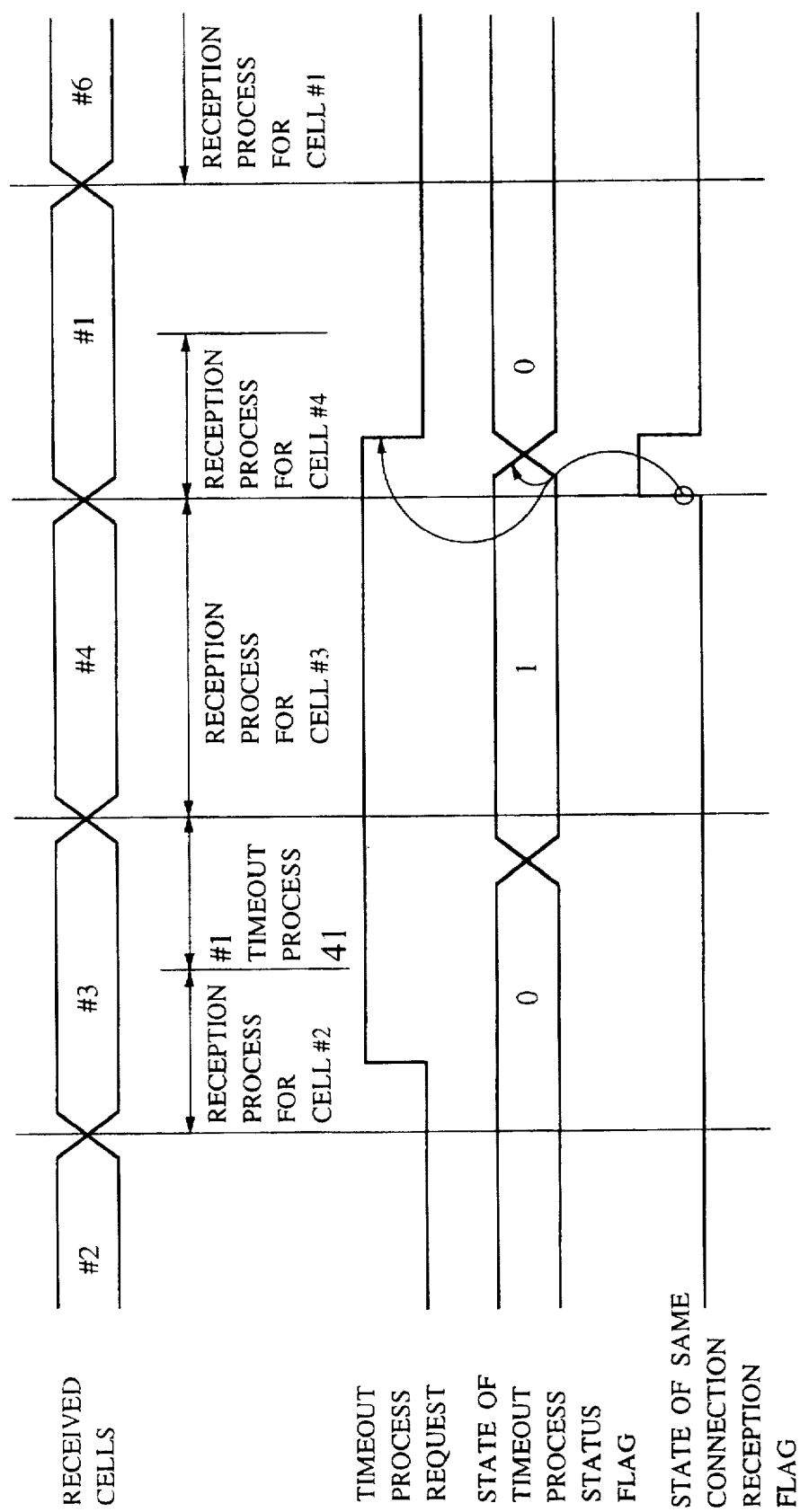
FIG. 10 is a timing chart of operation of the receiver shown in FIG. 9.

FIG. 10 is a timing chart showing the operation of the receiver 55 of the fifth embodiment shown in FIG. 9.

As a feature of the receiver 55 shown in FIGS. 9 and 10 in configuration and operation, a timeout process status flag (hereinafter called as "status process flag") for indicating a progress state of a subdivided timeout process after the detection of a timeout detected by the decision circuit 6 and a same connection reception flag are provided in the sequencer 26. By using both flags, the process after the timeout detection is executed during the cell reception process and the timeout process is aborted during processing if necessary based on the contents of the process status flag and the same connection reception flag.

The special feature of the receiver 55 of the fifth embodiment shown in FIG. 9 will be described.

In addition to the feature of the receiver 54 shown in FIGS. 7 and 8, the receiver 55 further comprises the same connection reception flag whose value is set when a cell in a same connection of a timeout detected by the decision circuit 6 is received during the current timeout process (including a wait state for the reception of a timeout process request, a load process 41, and a reset process 42 shown in FIG. 8). In this case, the timeout states flag is reset only when the timeout process status flag is zero or 1 in order to abort the current timeout process and the reception process of a reception cell in the same connection prior to the timeout process.

Specifically, in the timing chart of the receiver 55 of the fifth embodiment shown in FIG. 10, by introducing the same connection reception flag into the sequencer 25 of the receiver 54 of the seventh embodiment, only when a cell relating to the same connection (for example, called as "#1") which has been decided as the timeout by the decision circuit 6 is received after the detection of the timeout, is the timeout process status flag reset, in order to abort the current timeout process based on the timeout process request.

In the case where the subdivided timeout process only proceeds to a certain process status, for example, to the connection table loading (only to the #1 timeout process designated by the number "41" in the timing chart shown in FIG. 10), even when the timeout process is aborted no problem occurs.

However, if the current timeout process is not aborted, during the #1 timeout process 42 shown in FIG. 8, the content which has been written into the connection table 8 is not the same as the content in the sequencer 26 which has been transmitted from the connection table 8 during the #1 cell reception process. This is a problem. This problem occurs by performing the load operation of the connection table 8 prior to the reset process of the connection table 8 because cell reception processes are executed under a pipelined connection manner. Therefore, by using the same connection reception status flag, the content of the connection table 8 may be kept in agreement with the content of the connection table 8 which has been loaded into the sequencer 26 by performing the same connection reception process prior to the aborting the timeout process for this connection.

In addition to this feature, the receiver 55 of the fifth embodiment of the present invention can have the same features and the same effect of the receiver 54 of the fourth embodiment shown in FIGS. 7 and 8.

Figure 11:
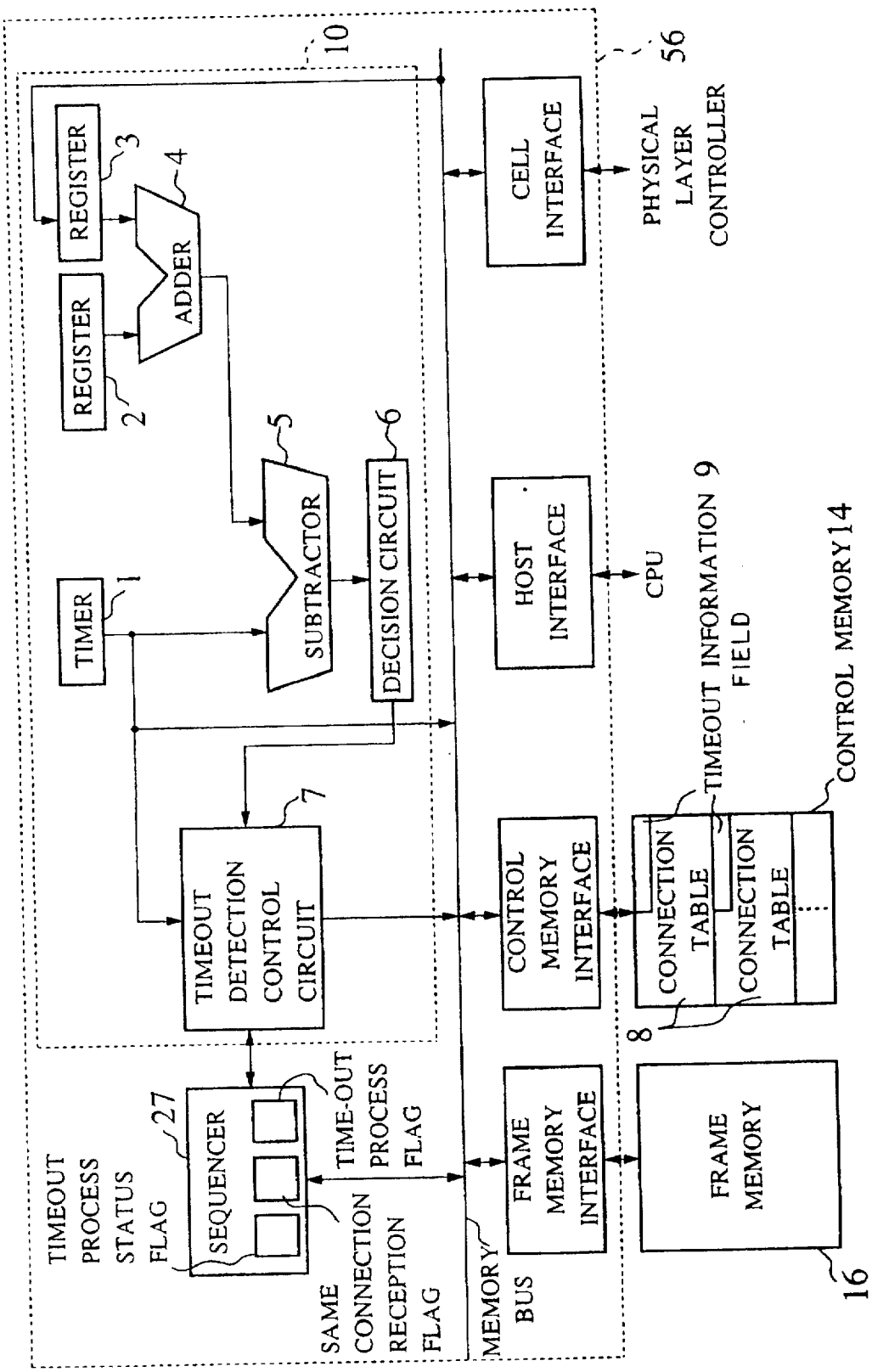
FIG. 11 is a configuration diagram of a receiver of a sixth embodiment of the present invention.

FIG. 11 is a configuration diagram of a receiver 56 of a sixth embodiment of the present invention.

The receiver 56 comprises the timeout process circuit 10 of the first embodiment shown in FIG. 4.

The receiver 56 of the sixth embodiment has additional features and effects relating to the configuration and operation of sequencer 27 in addition to the feature and the effect of the timeout process circuit 10 shown in FIG. 4.

Figure 12:
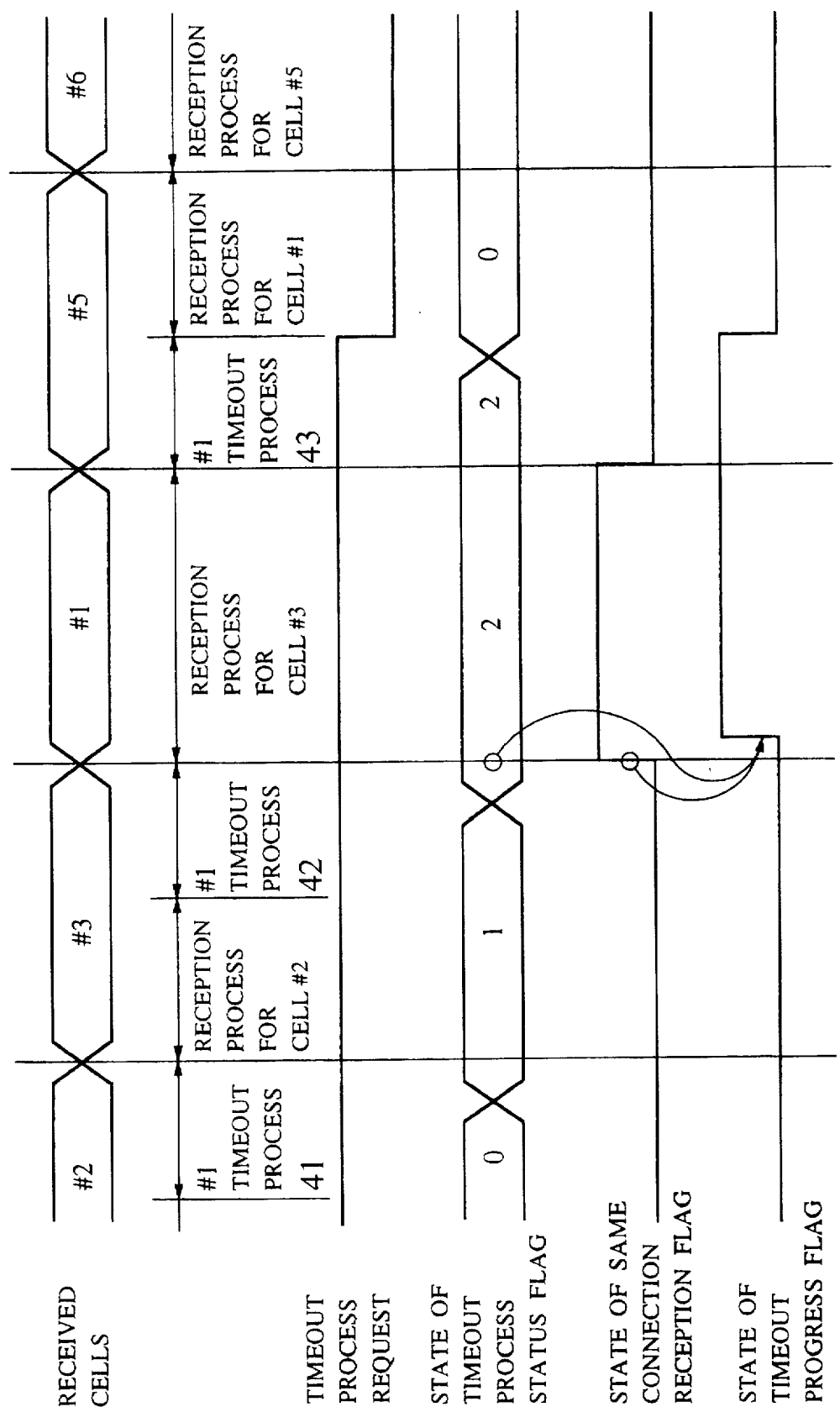
FIG. 12 is a timing chart of operation of the receiver shown in FIG. 11.

FIG. 12 is a timing chart of operation of the receiver 56 of the sixth embodiment of the present invention shown in FIG. 11.

The special features of the configuration and the operation of the receiver 56 of the sixth embodiment shown in FIG. 11 are as follows.

A timeout process status flag (hereinafter called a "status flag") for indicating the state of subdivided timeout processes after detection of the timeout, a same connection reception flag, and a timeout progress flag are provided into the sequencer 27.

The subdivided timeout processes are executed during a cell reception process relating to cell reception through the physical layer controller based on the contents of the process status flag, the same connection reception flag, and the timeout progress flag. If necessary, the current timeout process is aborted, or the #1 cell reception process is performed after the completion of the current timeout process only when a cell in the connection which has been decided by the decision circuit 6 as the timeout is received after the completion of the reset process 42 of the connection table 8.

Specifically, the feature of the receiver 56 of the sixth embodiment of the present invention shown in FIG. 11 is to perform the timeout processes prior to the reception process for a cell relating to the connection of the timeout after the timeout process flag is set in addition to the feature of the receiver 55 shown in FIGS. 9 and 10.

Specifically, in the receiver 56 of the sixth embodiment shown in FIGS. 11 and 12, in the process following timeout detection shown in FIG. 10, by introducing the timeout progress flag into the sequencer 27, when the timeout process request has been assigned, the reception process is given priority and the timeout process (for example #1) is carried out when a connection for which a timeout is decided and a cell in the same connection have been received.

In the case where the subdivided timeout processes are performed until a reset process is indicated by the #1 timeout process 42 shown in FIG. 12 for the analytical data table 8, for example, the sequencer 27 can not abort the timeout process. The sequencer 27 must perform the timeout process prior to the cell reception process of the same connection. It is impossible to release the frame memory 16 because the analytical data table 8 stores data about the frame which is decided as the timeout has been reset.

Further, when the error frame in the frame memory 16 is transmitted to an upper phase such as a CPU (omitted from FIG. 11), there is a problem where time sequence for storing a frame data table relating to the frame which has been reassembled, or an error frame, is reversed. In order to avoid the problem, by using the timeout progress flag, the timeout process is performed prior to the cell reception process in the same connection so that the frame memory 16 can be released correctly and the storing time sequence of the frame data table is kept correctly and so that it is also possible to obtain the same effect of the timeout process circuit 10 shown in FIG. 4.

As explained in the foregoing, a timeout is detected by subtracting the timer value for the current time from the sum of the timeout value and the timer value during cell reception by means of the present invention, access to the data table is reduced, and the data table can be efficiently accessed.

Further, since the timeout time for the sum of the timeout value and the timer value during cell reception is stored in the time data table, and a timeout is detected using this timeout time by means of the present invention, a timeout can be detected earlier, and the timeout detection can be performed at a much higher speed.

In addition, by means of the present invention, since the next timeout detection start signal is generated during a current timeout detection operation when the next timeout detection start signal is stored in a register, and after the current timeout detection operation has been completed, it is possible to continuously detect timeout operation, and it is possible to quickly detect the occurrence of a timeout so that it is possible to efficiently use a frame memory.

In addition, by means of the present invention, since the timeout process is carded out during the cell reception process corresponding to the progress of the current timeout process, even in the case where timeout processes extend over a period of time, it is possible to execute the cell reception processes and the timeout processes alternately, so that effective arbitration control of the cell reception process and the timeout process request is possible, and it is possible to efficiently carry out a timeout detection which is possible to execute and a timeout process in parallel with a cell reception process.

In addition, by means of the present invention, since in the case when a cell of a connection which has been detected as a timeout is received, the timeout process is aborted, so that it is possible to execute the cell reception process prior to the timeout process in the same connection, it is possible to effectively control arbitration of the cell reception process and the timeout process request in the same connection, and it is possible to efficiently carry out a timeout detection which is possible to execute and a timeout process in parallel with a cell reception.

Finally, by means of the present invention since in the case when a cell in the same connection which has been detected as a timeout is received, the timeout process is carried out prior to the cell reception process, it is possible to arbitrate the execution of the cell reception process of the same connection and the timeout process request until the reset process to the connection table, so that it is possible to efficiently carry out a timeout detection which may execute a timeout process in parallel with a cell reception.

While the above provides a full and complete disclosure of the preferred embodiments of the present invention, various modifications, alternate constructions and equivalents may be employed without departing from the true spirit and scope of the invention. Therefore the above description and illustration should not be construed as limiting the scope of the invention, which is defined by the appended claims.

What is claimed is:

1. A receiver for assembly of a frame which is subdivided into a plurality of cells for data communication, the receiver including a timeout process circuit for performing a timeout detection process, the timeout process circuit comprising:

timer means for incrementing time data indicating current time and transmitting the time data and a timeout detection start signal;

memory means comprising data table for storing a reception time of a cell most recently received by the receiver;

first register means for storing a timeout value indicating a maximum permitted time interval of cell reception;

control means for reading out the reception time stored in the data table in the memory means when the control means receives the timeout detection start signal from the timer means;

adder means for adding the reception time read out from the data table and the timeout value stored in the first register means;

comparator means for comparing the result of the addition performed by the adder means with the time data from the timer means; and decision means for receiving the comparison result from the comparator means and deciding whether the cell of the frame in the reassembly is a timeout based on the comparison result.

2. The receiver of claim 1, wherein the timeout process circuit further comprises:

state means for receiving and storing the number of the timeout detection start signals transmitted from the timer means, and for transmitting the timeout detection start signal to the control means as long as there is the timeout detection start signal of at least one in the state means, wherein when receiving the timeout detection start signal transmitted from the state means, the control means initiates the timeout detection operation, and the control means transmits a timeout detection completion signal to the state means when the timeout detection operation is completed, and the control means executes continuously the timeout detection process when the control means receives a following timeout detection start signal from the state means and the control means transmits the timeout detection completion signal to the state means.

3. The receiver of claim 2, further comprising:

first flag means for storing a process status flag which indicates a state of execution of the timeout process which is subdivided into several subprocesses which are executed separately in time sharing, wherein the control means executes each of the detection subprocesses separately in time based on the content of the process status flag during the cell reception process.

4. The receiver of claim 1, further comprising:

first flag means for storing a process status flag which indicates a state of execution of the timeout process which is subdivided into several subprocesses which are executed separately in time sharing, wherein the control means executes each of the subprocesses separately in time based on the content of the process status flag during the cell reception process.

5. The receiver of claim 4, further comprising:

second flag means for storing a same connection reception status flag indicating an occurrence of a cell reception of a connection which is the same connection as in the timeout processing operation, wherein, when the cell reception in the connection of the timeout processing operation has occurred, the process status flag is reset so that the timeout process is aborted and the cell reception process is executed prior to this timeout process based on a content of the same connection status flag.

6. The receiver of claim 4, further comprising third flag means for storing a progress status flag for indicating a progress state of the timeout detection process, wherein, when the cell reception in the connection of the timeout processing operation has occurred, the timeout process is executed prior to the cell reception process based on a content of the progress status flag.

7. The receiver of claim 5, further comprising third flag means for storing a progress status flag for indicating a progress state of the timeout process, wherein, when the cell reception in the connection of the timeout detection operation has occurred, the timeout process is executed prior to the cell reception process based on a content of the progress status flag.

8. The receiver of claim 1, wherein the reception time of the cell is stored in the data table when the cell is received by the receiver.

9. A receiver for reassembly of a frame which is subdivided into a plurality of cells for data communication, the receiver including a timeout process circuit for detecting a timeout detection process, the timeout process circuit comprising:

timer means for incrementing time data indicating current time and for transmitting the time data and a timeout detection start signal;

first register means for storing a timeout value indicating a maximum permitted time interval of cell reception of each of the plurality of cells;

adder means for adding the time data from the timer means and the timeout value from the first register means and transmitting the result of the addition as a timeout time;

memory means comprising a data table for storing the timeout time relating to the cell most recently received by the receiver;

control means for reading out the reception time stored in the data table in the memory means when the control means receives the timeout detection start signal from the timer means;

comparator means for comparing the timeout time of the cell read out by the control means and the current time from the timer means; and decision means for receiving the comparison result from the comparator means and deciding whether the cell of the frame in the reassembly is a timeout based on the comparison result, wherein the timeout time of the cell is stored in the data table when the cell is received by the receiver.

10. The receiver of claim 2, wherein the timeout process circuit further comprises:

state means for receiving and storing the number of the timeout detection start signals transmitted from the timer means, and for transmitting the timeout detection start signal to the control means as long as there is the timeout detection start signal of at least one in the state means, wherein when receiving the timeout detection start signal transmitted from the state means, the control means initiates the timeout detection operation, and the control means transmits a timeout detection completion signal to the state means when the timeout detection operation is completed, and the control means executes continuously the timeout detection process when the control means receives a following timeout detection start signal from the state means and the control means transmits the timeout detection completion signal to the state mens.

11. The receiver of claim 9, further comprising:

first flag means for storing a process status flag which indicates a state of execution of the timeout process which is subdivided into several subprocesses which are executed separately in time sharing, wherein the control means executes each of the subprocesses separately in time based on the content of the process status flag during the cell reception process.

12. The receiver of claim 9, wherein the reception time of the cell is stored in the data table when the cell is received by the receiver.

13. A receiver for reassembly of a frame which is subdivided into a plurality of cells for data communication, the receiver comprising a timeout process circuit for performing a timeout detection process, the timeout process circuit comprising:

timer means for incrementing time data indicating current time and transmitting the time data and a timeout detection start signal;

memory means comprising data table for storing a reception time of the cell which being most recently received by the receiver;

first register means for storing a timeout value indicating a maximum permitted time interval of the cell reception;

control means for reading out the reception time stored in the data table in the memory means when the control means receives the timeout detection start signal from the timer means;

adder means for adding the reception time read out from the data table and the timeout value stored in the first register means;

comparator means for comparing the result of the addition performed by the adder means with the time data from the timer means; and decision means for receiving the comparison result from the comparator means and deciding whether or not the cell of the frame in the reassembly is a timeout based on the comparison result;

the receiver further comprising first flag means for storing a process statue flag Which indicates a state of execution of the timeout process which being subdivided into several subprocesses which being executed separately in time sharing, wherein the control means executes each of the subprocesses separately in time based on the content of the process status flag during the cell reception process.

14. The receiver of claim 13, further comprising second flag means for storing a same connection reception status flag indicating an occurrence of a cell reception of a connection which being the same connection in the timeout processing operation, wherein, when cell reception in the connection of the timeout processing operation has occurred, the process status flag is reset so that the timeout process is aborted and the cell reception process is executed prior to this timeout process based on a content of the same connection status flag.

15. The receiver of claim 14, further comprising third flag means for storing a progress status flag for indicating a progress state of the timeout process, wherein, when cell reception in the connection of the timeout detection operation has occurred, the timeout process is executed prior to the cell reception process based on a content of the progress status flag.

16. The receiver of claim 13, further comprising third flag means for storing a progress status flag for indicating a progress state of the timeout detection process, wherein, when cell reception in the connection of the timeout processing operation has occurred, the timeout process is executed prior to the cell reception process based on a content of the progress status flag.

17. A receiver for reassembly of a frame which is subdivided into a plurality of cells for data communication, the receiver comprising a-timeout process circuit for detecting a timeout detection process, the timeout process circuit comprising:

timer means for incrementing time data indicating current time and transmitting the time data and a timeout detection start signal;

first register means for storing a timeout value indicating a maximum permitted time interval of a cell reception of each of the plurality of cells;

adder means for adding the time data from the timer means and the timeout value from the first register means and transmitting the result of the addition as a timeout time;

memory means comprising data table for storing the timeout time relating to the cell which being most recently received by the receiver;

control means fox reading out the timeout time of the cell stored in the data table in the memory means when the control means receives the timeout detection start signal from the timer means;

comparator means for comparing the timeout time of the cell read out by the control means and the current time from the timer means; and decision means for receiving the comparison result from the comparator means and deciding whether or not the cell of the frame in the reassembly is a timeout based on the comparison result, wherein the timeout time of the cell is stored in the data table when the cell is received by the receiver;

the receiver further comprising:

first flag means for storing a process statue flag which indicates a state of execution of the timeout process which being subdivided into several subprocesses which being executed separately in time sharing, wherein the control means executes each of the subprocesses separately in time based on the content of the process status flag during the cell reception process.

18. A receiver for reassembly of a frame which is subdivided into a plurality of cells for data communication, the receiver comprising a timeout process circuit for performing a timeout detection process, the timeout process circuit comprising:

timer means for incrementing time data indicating current time and transmitting the time data and a timeout detection start signal;

memory means comprising data table for storing a reception time of the cell which being most recently received by the receiver;

first register means for storing a timeout value indicating a maximum permitted time interval of the cell reception;

control means for reading out the reception time stored in the data table in the memory means when the control means receives the timeout detection start signal from the timer means;

adder means for adding the reception time read out from the data table and the timeout value stored in the first register means;

comparator means for comparing the result of the addition performed by the adder means with the time data from the timer means;

decision means for receiving the comparison result from the comparator means and deciding whether or not the cell of the frame in the reassembly is a timeout based on the comparison result; and state means for receiving and storing the number of the timeout detection start signals transmitted from the timer means, and transmitting the timeout detection start signal to the control means as long as there is the timeout detection start signal of at least one in the state means, wherein, when receiving the timeout detection start signal transmitted from the state means, the control means initiates the timeout detection operation, and the control means transmits a timeout detection completion signal to the state means when the timeout detection operation is completed, and the control means executes continuously the timeout detection process when the control means receives a following timeout detection start signal from the state means and the control means transmits the timeout detection completion signal to the state means;

the receiver further comprising:

first flag means for storing a process statue flag which indicates a state of execution of the timeout process which being subdivided into several subprocesses which being executed separately in time sharing, wherein the control means executes each of the detection sub-processes separately in time based on the content of the process status flag during the cell reception process.

* * * * *